United States Patent [19]

Bonomo

[11] Patent Number: 5,421,066

[45] Date of Patent: Jun. 6, 1995

[54] SELF-LOCKING TENSIONING BAR

[76] Inventor: Melvin E. Bonomo, 6483 SW. 107th Pl., Ocala, Fla. 34476-4811

[21] Appl. No.: 243,269

[22] Filed: May 16, 1994

[51] Int. Cl.6 ............................................. A44B 11/00
[52] U.S. Cl. ..................................... 24/270; 24/68 F; 24/273
[58] Field of Search ............... 24/68 F, 69 ST, 71 R, 24/71 ST, 40, 270, 271, 272, 273, 129 R, 129 A, 16 R, 481

[56] References Cited

U.S. PATENT DOCUMENTS

| 357,810 | 2/1887 | Baynes | 24/273 |
| 357,877 | 2/1887 | Taylor | 24/129 R |
| 485,671 | 11/1892 | Webb | 24/16 R |
| 521,227 | 6/1894 | Webb | 24/273 |
| 880,926 | 3/1908 | Shugart | 24/272 |
| 1,362,517 | 12/1920 | Stuart et al. | 24/481 |
| 3,317,967 | 5/1967 | Rounds et al. | 24/272 |

FOREIGN PATENT DOCUMENTS

| 0238635 | 2/1965 | Austria | 24/270 |
| 0646660 | 5/1937 | Germany | 24/273 |

Primary Examiner—Victor N. Sakran
Attorney, Agent, or Firm—Julian C. Renfro

[57] ABSTRACT

A self-locking tensioning bar usable for tightening a cord utilized to encircle a relatively large object, such tensioning bar being elongate and having first and second ends, with a longitudinally disposed slot disposed in the first end. A spaced pair of holes for receiving the cord are disposed in an offset relationship in the bar, with one of the cord-receiving holes located near the outer end of the slot, and consequently near the first end of the tensioning bar. One end of the cord is secured in the one cord-receiving hole, with the cord then extending around the relatively large object, and thence back through the other cord-receiving hole. The cord is brought to an initial degree of tension while the bar is residing in a substantially perpendicular relationship to the object, with the first end of the bar closely adjacent the large object, following which the cord is then anchored to maintain such initial degree of tension. Upon the tensioning bar thereafter being bent from the perpendicular relationship into a position flat against the object and in essential parallelism with the tensioned cord, the cord is caused, because of the offset relationship of the holes, to be brought into a final degree of tension around the object. The bar is then moved to a locking relationship, to achieve a locking of the cord in the finally tensioned condition.

21 Claims, 1 Drawing Sheet

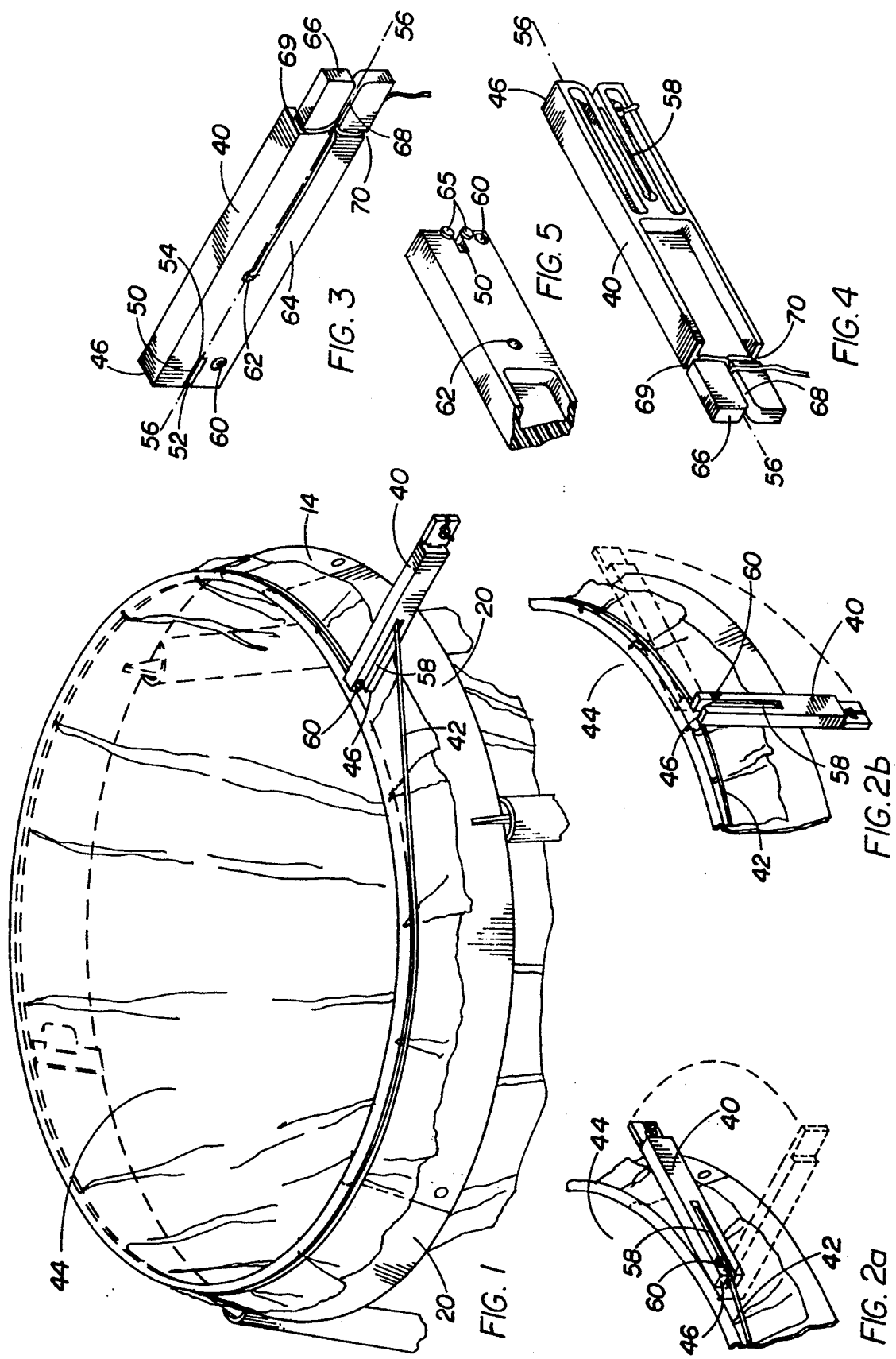

SELF-LOCKING TENSIONING BAR

RELATIONSHIP TO OTHER INVENTION

Although not to be limited to such usage, the present invention is particularly adapted for use with my co-pending application entitled "Collapsible Holder for Thin Plastic Bag Utilizing Novel Tightening Means," Ser. No. 08/243,159, filed May 16, 1994, for by the use of the instant device, the open top of a plastic leaf bag can be caused to grip the top of a trashcan or a bag holder very tightly.

BACKGROUND OF THE INVENTION

Almost everyone at one time or another has utilized a form of tie-down in endeavoring to secure a canopy, tarpaulin or the like around an object, to protect such object from the weather. One example of an effort of this type is involved when attempting to secure a canopy or tarpaulin around an outdoor cooker at the end of the summer season, to prevent the accumulation of snow or rain and consequent rusting of the device. Another example would be the securing of a canopy or tarpaulin around an outboard motor at the end of the boating season, to minimize damage to the motor due to dampness and the like.

An entirely different tie-down arrangement is involved when securing a plastic leaf bag or the like around the upper rim of a trashcan, bag holder or the like, so that the bag will not slip away from the upper part of the bag holder when the bag is nearing fullness, and the weight of the leaves has become considerable.

The typical tie-down arrangement for holding a leaf bag to the upper rim of a trashcan, bag holder or the like has in the past involved either the user attempting to tie a cord tightly around the top of the bag, to hold it in place, or else attempting to utilize a large elastic band, or else a cord in which a tension spring has been interposed.

The difficulty of these arrangements is that typically it is almost impossible to tie a cord tightly enough as to prevent the thin plastic leaf bag from slipping downwardly at the time it is nearing fullness, because of the slick, slippery nature of the plastic bag. When using an elastic band, or else a cord with a spring in it, a considerable force is necessarily involved in attempting to deploy it properly around the bag if slippage of the bag is to be prevented. This force can be so substantial as to make it practically impossible for a child or lady to exert sufficient force to achieve the proper installation of the elastic band or spring cord around the object.

It was in an effort to improve upon tie-down arrangements of the prior art that the present invention was evolved.

SUMMARY OF THE INVENTION

This invention involves a novel self-locking tensioning bar usable for tightening a cord utilized to encircle a comparatively large object, such as either the upper rim of a trashcan or bag holder, or else an irregularly-shaped object such as an outdoor cooker, or outboard motor or the like. In the case of a trashcan or bag holder, my novel tensioning bar can be very easily and effectively utilized for holding the open upper edges of a plastic bag tightly in a slip-free manner against the upper rim of the trashcan or bag holder.

This novel self-locking tensioning bar is elongate and substantially of rectangular configuration, having first and second ends, and having a longitudinally disposed slot disposed adjacent the first end. A pair of cord-receiving holes are located in an offset relationship in the bar, with a first of such holes located relatively near the longitudinally disposed slot. One end of the cord extends from the first cord-receiving hole, then around the large object, and thence back through the second cord-receiving hole, while the tensioning bar is residing in a substantially perpendicular relationship to the large object. The cord is then being brought to an initial degree of tension, following which the cord is tightly anchored to the second end of the bar. The user then rotates the tensioning bar from the perpendicular relationship to the large object into a position flat against the object, with the bar then residing in an essentially parallel relationship to the tensioned cord. As a result of the offset relationship of the two cord-receiving holes, this rotation of the tensioning bar causes the cord to be brought into a final degree of tension around the object. The bar can then be rotated approximately 90° into a locking position with respect to the tensioned cord.

This invention may also be characterized as a novel method of tightening a cord around a relatively large object by the use of a tensioning bar of elongate construction that has a longitudinally disposed slot disposed in one end and extending for less than half the length of the bar, with a cord anchored adjacent the slot. This novel method comprises the steps of passing the free end of the cord around the object, and thence passing the cord back through the tensioning bar, while the tensioning bar is residing in a substantially perpendicular relationship to the object, with the cord then being brought to an initial degree of tension. At this point the cord is anchored to the end of the bar remote from the large object. The tensioning bar is then rotated from the perpendicular relationship to the object, into a position residing flat against the object, with such manipulation of the tensioning bar causing the cord to be brought into a final degree of tension around the object. This step is followed by moving the tensioning bar to a locking position with respect to the tensioned cord.

This procedure results in the placement of the cord to a much higher degree of tension than is possible by other means, and without the outlay of any particular amount of strength on the part of the user.

As mentioned hereinabove, the present invention is particularly adapted for use with my co-pending application entitled "Collapsible Holder for Thin Plastic Bag Utilizing Novel Tightening Means," Ser. No. 08/243,159, filed May 16, 1994 inasmuch as it is most important for the open top of a plastic leaf bag to be caused to grip the top of a trashcan or a bag holder very tightly, and this can be accomplished very effectively by the use of the present invention.

It is a principal object of my invention to provide a self-locking tensioning bar of inexpensive yet highly effective construction, which can be utilized for installing a cord very tightly around a relatively large object without the exercise of any considerable amount of strength in order to accomplish such installation.

It is another object of my invention to provide a self-locking tensioning bar of low cost construction, functioning to install a cord to an extremely high degree of tension around either a circularly-shaped object or an irregularly-shaped object, with this being accomplished in a very simple and effortless manner.

It is a very important object of my invention to provide a novel tensioning means for encompassing a ring-shaped member in such a manner as to hold the open end of a flexible bag tightly against such ring-shaped member, thereby to almost completely eliminate slippage of the bag, even when the bag is heavily laden.

It is another object of my invention to provide a novel tensioning means, usable by anyone, even a child or a lady, utilizing an self-locking tensioning bar with which a cord is operatively associated, with the cord being able to be brought into a condition of initial tension, followed by the cord being locked to the tensioning bar, and then rotated to bring about a condition of substantial tension in the cord, accomplished in a relatively effortless manner.

It is yet another object of my invention to provide a small, inexpensive and generally rectangularly-shaped bar containing therein a pair of holes disposed in an offset relationship, by the use of which bar a person not possessing considerable strength can readily bring a cord associated with such bar into a high degree of tension around a comparatively large object.

These and other objects, features and advantages will be more apparent from a study of the appended drawings.

BRIEF DESCRIPTION OF THE DRAWINGS

FIG. 1 is a perspective view of the upper portion of a bag-supporting stand in accordance with my invention, in operative engagement with which is a novel self-locking tensioning bar of a type preferred for applying substantial tension to the cord encircling the open upper edge of a thin plastic bag, with the tensioning bar being shown in this instance in a first position with respect to the bag-supporting stand;

FIG. 2a is a fragmentary view of the upper portion of the bag-supporting stand of FIG. 1, with the tensioning bar being depicted as having been rotated to a second position, with this rotation of the bar causing the cord to tightly engage the bead or abutment extending around the upper edge of the sloped bag-contacting surface;

FIG. 2b is a fragmentary view relatable to FIG. 2a, but with tensioning bar having been moved to a locking position in which the bar resides after the tightening procedure has been completed;

FIG. 3 is a perspective view to a substantially enlarged scale, of the smooth side of my novel self-locking tensioning bar, which is the side of the bar to be brought against the tensioned cord as a consequence of the rotation depicted in FIG. 2a;

FIG. 4 is a perspective view to approximately the same scale utilized in FIG. 3, but here showing the other or outer side of my novel self-locking tensioning bar, to reveal an elongate, cord-receiving slot or groove that may extend along a portion of this outer side; and FIG. 5 is a fragmentary view of a tensioning bar of modified construction, in which a pair of protruding pins are utilized for cord control, instead of the elongate, cord-receiving slot revealed in FIG. 4.

DETAILED DESCRIPTION

With reference now to FIGS. 1 through 2b as well as FIG. 3 through 5, it will be seen that I have shown my novel self-locking tensioning bar 40 usable for tightening a cord 42 in a highly effective manner around an object, such as the large circular object 44 visible in this figure, with this tightening being accomplished by a novel form of self-locking action.

As previously indicated, this self-locking tensioning bar is particularly adapted for use with the invention set forth in my co-pending patent application "COLLAPSIBLE HOLDER FOR THIN PLASTIC BAG UTILIZING NON-SLIP TIGHTENING MEANS," and the details of that device are mentioned from time to time herein inasmuch as the present SELF-LOCKING TENSIONING BAR can ideally be utilized with my novel collapsible bag holder forming the subject of my other invention.

It is of course to be realized that the large circular object 44 can be the previously-described ring member 12 defining the downwardly and outwardly sloping external surface 14, created by interfitting the curved segment members 20 together, but my novel tensioning bar 40 forming the subject matter of this invention is obviously not limited to use with that particular type of device.

As seen to a larger scale in FIGS. 3 and 4, my novel self-locking tensioning bar 40 is elongate, being of substantially rectangular configuration. The side of the tensioning bar 40 visible in FIG. 3 is preferably smooth, whereas the side of the same bar visible in FIG. 4 is channeled. Importantly, and as best seen in FIG. 3, a longitudinally disposed slot 50 is disposed on the end 46 of the tensioning bar 40, with the slot 50 extending entirely through the bar 40, being located on the longitudinal centerline 56—56 of the tensioning bar.

Readily seen in FIG. 3 is a first cord-receiving hole 60, located near the end 46 of the bar 40, and adjacent the longitudinally disposed slot 50. Also visible in FIG. 3 is a second cord-receiving hole 62, intended to receive the free end of the cord after it has been passed around the large circular object. The hole 62 is located in a mid portion of the bar 40, in a position comparatively remote from the end 46 of the bar 40, but nevertheless closer to the end 46 than to the end 66 of the tensioning bar. The holes 60 and 62 are thus to be seen to be in an offset relationship, and these holes are intended to receive a relatively strong cord, such as will withstand a 70 pound pull, provided for a purpose soon to be described. For example, the second cord-receiving hole 62, which is located on the centerline 56—56 of the tensioning bar 40, may be offset a distance of approximately $\frac{3}{8}$" from the first cord-receiving hole 60, but this distance will vary, depending upon the particular circumstances. In one particular instance, the tensioning bar 40 was made of polypropylene, being approximately three inches long, approximately 9/16" wide, and approximately $\frac{1}{4}$" thick. However, I obviously am not to be limited to any particular dimension or to any particular constructional material.

From FIG. 3 it will be seen that the longitudinally disposed slot 50 extends for a limited extent along the longitudinal centerline 56—56, and in one prototype, the slot was 0.280" deep, but quite obviously I am not to be limited to this. For a reason soon to become apparent, the width dimension of the slot 50 is very nearly the same as the diameter of the cord 42, and in one particular instance, the slot was 0.070" wide. The slot 50 has an outer end 52 and an inner end 54, with the outer end 52 being spaced just inside the end 46 of the tensioning bar.

In the embodiment of my invention depicted in FIG. 4, an elongate groove or cavity 58 extends along centerline 56—56 from the slot 52 to the immediate vicinity of the second cord-receiving hole 62. The elongate groove or slot 58 does not extend through to the smooth side of the bar 40, and it is in the groove 58 that the cord 42 resides during the tightening phase of the operation of my tensioning bar 40, when the relatively smooth side of the tensioning bar illustrated in FIG. 3 is brought into contact with the large circular object, in the manner shown in FIG. 2a.

In the first cord-receiving hole 60, one end of the cord 42 is to be anchored, such as by tying a knot therein of suitable size. The cord also extends through the second cord-receiving hole 62, but only after passing around the large circular object 44. In other words, a comparatively large loop may be regarded as normally existing in the cord 42 between the first and second cord-receiving holes. The second cord-receiving hole 62 is located on the centerline 56—56 of the tensioning bar 40 at a location that is offset approximately ⅞" away from the first cord-receiving hole 60. However, I am not to be limited to this particular distance.

Returning to FIG. 1, it will be noted in this figure that the cord 42 has been passed around the large object 44 and the tensioning bar 40 has been caused to be disposed in a substantially perpendicular relationship to the object 44. In this instance, the end 46 of the tensioning bar is in contact with the object 44. While the bar 40 is in this substantially perpendicular relationship, the user pulls upon the cord 42 at a location comparatively close to the second cord-receiving hole 62, to bring the cord to an initial degree of tension around the object 44. The end of the cord is then pulled tightly into a slot 68, which may be a tapered slot, also referred to as a secondary slot, which is provided at end 66 of the tensioning bar; note FIGS. 3 and 4.

At this point the user proceeds to lock the cord in the slot 68, by first passing the cord into notch 69, for example, thence back into slot 68, and thereafter inserting the cord tightly in notch 70, followed by returning the cord to the slot 68. This arrangement by which the cord is affixed to the end 66 of the bar is generally indicated in FIGS. 3 and 4. As will be readily understood, this procedure serves to tightly anchor the cord 42 with respect to the end of the bar 40 remote from the end 46 in contact with the large object 44.

Having firmly anchored the cord to the bar 40, the user now is ready to bend or rotate the bar from the position shown in FIG. 1, into the position shown in solid lines in FIG. 2a, in which the side of the bar depicted in FIG. 3 comes into close contact with a tensioned cord portion and with the large object 44. This movement of the bar 40, which may be regarded as rotation in a counter-clockwise direction as viewed in FIG. 1, may be regarded as rotation in the plane of the tensioned cord 42 as the cord extends around the large object. This movement of the bar from the position depicted in FIG. 1 into the position shown in full lines in FIG. 2a amounts to approximately 90° of rotation, and this movement has the effect of causing the cord 42 to enter the previously-mentioned elongate groove or cavity 58, in the manner depicted in FIG. 2a.

Because of the offset relationship of the first and second cord-receiving holes 60 and 62, this rotative movement of the bar causes the cord 42 to be brought into a substantial degree of tension around the object, but in order to prevent the bar from (undesirably) returning to the outwardly-extending position depicted in dashed lines in FIG. 2a should the bar be released, it is then desirable for the bar to be moved 90° downwardly, into the position shown in FIG. 2b. This downward movement or rotation has the effect of forcing the cord under the first end of the bar and into the slot 50, thus bringing about a highly effective locking action. The user may find it convenient to press with the tip of one finger against the tensioned cord 42 at such time as he is endeavoring to bring the bar 40 to the downwardly extending position shown in FIG. 2b. The substantial tension now existing in the cord 42 could not be reduced unless this procedure was for some reason reversed.

As an indication of the substantial tension now existing in the cord 42, if while the bar 40 is hanging downwardly in the position depicted in FIG. 2b, the user should lift the end 66 somewhat away from the circular object 44, the bar will rotate about the end 46, and should the end 66 then be released, the substantial tension in the cord 42 will cause the bar to snap back into the flat position depicted in FIG. 2b.

I am not limited to the use of the elongate groove or cavity 58 depicted in FIG. 4, for as illustrated in FIG. 5, I may utilize a short, outwardly protruding pin 65 on each side of the slot 50. These pins serve to prevent undesirable cord slippage during the time that the bar is being rotated in the plane of the tensioned cord from the position shown in full lines in FIG. 2a, into the position shown in FIG. 2b. In other words, the pins 65 serve as an alignment means or cord-confining means that assures the cord residing along the longitudinal centerline of the bar and having a proper relationship to the second cord-receiving hole 62.

Those familiar with this art will readily understand that my novel self-locking tensioning bar provides a ready means for a person not possessing considerable strength, to place the cord 42 around a circular object to a high degree of tension. The length of the tensioning bar is preferably on the order of four times the width, and I have found that a bar that is approximately 3" in length is usually ideal. However, if the holes 60 and 62 are offset more than approximately one inch, it may be necessary to increase the length of the tensioning bar a bit, in order to give the user sufficient mechanical advantage for bringing the cord to a desirably high degree of tension. Obviously I am not to be limited to these dimensions, except as required by the scope of the appended claims.

I claim:

1. A self-locking tensioning bar usable for tightening a cord utilized to encircle a relatively large object, said tensioning bar being elongate and of substantially rectangular configuration, said tensioning bar having first and second ends, with a longitudinally disposed slot disposed in said first end, a spaced pair of holes for receiving said cord, with one of said cord-receiving holes located near the outer end of said slot, and consequently near said first end of said tensioning bar, the other of said cord-receiving holes being disposed in a mid portion of said bar, in a longitudinally offset relationship to said one hole, one end of said cord secured in said one cord-receiving hole, said cord then extending around the relatively large object, and thence back through said other cord-receiving hole, said cord then to be brought to an initial degree of tension while said bar is residing in a substantially perpendicular relationship to the object, with said first end of said bar closely adjacent the large object, said cord then being anchored to said bar at a location adjacent said second end of said bar, to maintain such initial degree of tension, whereby upon said tensioning bar thereafter being bent from the perpendicular relationship to the object into a position flat against the object and in essential parallelism with the tensioned cord, said cord is caused, because of the offset relationship of said holes, to be brought into a final degree of tension around the object, said bar thereafter being rotated approximately 90° with respect to said tensioned cord, to achieve a locking of said cord in the finally tensioned condition.

2. The self-locking tensioning bar usable for tightening a cord utilized to encircle a relatively large object as recited in claim 1 in which a relatively short pin resides on each side of said longitudinally disposed slot, said pins serving as an alignment means for said cord at such time as said bar has been bent into the position flat against the object and in essential parallelism with the tensioned cord.

3. The self-locking tensioning bar usable for tightening a cord utilized to encircle a relatively large object as recited in claim 1 in which said bar is comparatively flat, being of a width approximately twice the thickness of the bar, said longitudinally disposed slot and said cord-receiving holes extending from one flat side of the bar to the other, through the thickness dimension of the bar.

4. The self-locking tensioning bar usable for tightening a cord utilized to encircle a relatively large object as recited in claim 1 in which the cord anchoring is accomplished by the use of a slot residing in said second end of said bar, into which slot, the loose end of said cord is tightly fitted.

5. The self-locking tensioning bar usable for tightening a cord utilized to encircle a relatively large object as recited in claim 4 in which a pair of notches are located on said second end of said bar, adjacent said slot, said pair of notches being utilized for securing the loose end of said cord in an encircling relationship to said bar.

6. The self-locking tensioning bar usable for tightening a cord utilized to encircle a relatively large object as recited in claim 1 in which a longitudinal centerline extends the length of said bar, said cord-receiving holes being located relatively close to said longitudinal centerline, and extending through the thickness dimension of said bar.

7. A self-locking tensioning bar usable for tightening a cord utilized to encircle a relatively large object, said tensioning bar being elongate and of substantially rectangular configuration, said tensioning bar having first and second ends, with a longitudinally disposed slot disposed in said first end, a spaced pair of holes for receiving said cord, with one of said cord-receiving holes located near the outer end of said slot, and consequently near said first end of said tensioning bar, the other of said cord-receiving holes being disposed in a mid portion of said bar, in a longitudinally offset relationship to said one hole, one end of said cord secured in said one cord-receiving hole, said cord then extending around the relatively large object, and thence back through said other cord-receiving hole, said cord then to be brought to an initial degree of tension while said bar is residing in a substantially perpendicular relationship to the object, with said first end of said bar closely adjacent the large object, said cord then being anchored to said bar at a location adjacent said second end of said bar, to maintain such initial degree of tension, whereby upon said tensioning bar thereafter being bent from the perpendicular relationship to the object into a position flat against the object and in essential parallelism with the tensioned cord, said cord is caused, because of the offset relationship of said holes, to be brought into a final degree of tension around the object, said bar thereafter being rotated approximately 90° with respect to said tensioned cord, to achieve a locking of said cord in the finally tensioned condition, a longitudinal centerline extending the length of said bar, an elongate groove disposed on one of the flat sides of said bar, which elongate groove extends along said centerline and into direct contact with said other hole, into which elongate groove said cord can reside at such time as said bar has been bent into the position flat against the object and in essential parallelism with the tensioned cord.

8. The self-locking tensioning bar usable for tightening a cord utilized to encircle a relatively large object as recited in claim 2 in which said elongate groove does not extend from one flat side of said bar to the other.

9. A self-locking tensioning bar usable for tightening a cord utilized to encircle a relatively large object, said tensioning bar being elongate and substantially of rectangular configuration, said tensioning bar having a longitudinally disposed slot in one end, a pair of cord-receiving holes disposed in said bar, a first of said cord-receiving holes being located near the outer end of said slot, and the second of said cord-receiving holes being offset from said first hole, being located comparatively remote from said end of said tensioning bar, one end of said cord extending from said first cord-receiving hole, then around the relatively large object, and thence back through said second cord-receiving hole, while said tensioning bar is residing in a substantially perpendicular relationship to the object, said cord then being brought to an initial degree of tension, means for anchoring said cord to preserve such initial degree of tension, preparatory to the step of finally tensioning said cord, said tensioning bar, upon thereafter being bent from the perpendicular relationship to the object into a position flat against the object, causing said cord to be brought into a final degree of tension around the object, and means for maintaining said final degree of tension in a secure manner.

10. The self-locking tensioning bar usable for tightening a cord utilized to encircle a relatively large object as recited in claim 9 in which said means for maintaining the final degree of tension in the cord is as a consequence of the rotation of said bar for approximately 90° with respect to the position of the tensioned cord, after the final degree of tension has been achieved.

11. The self-locking tensioning bar usable for tightening a cord utilized to encircle a relatively large object as recited in claim 9 in which a secondary slot is located in the opposite end of the tensioning bar from the first-mentioned slot, said secondary slot being intended to receive the loose end of the cord, and thus to serve as said anchoring means.

12. A method of tightening a cord around a relatively large object by the use of a tensioning bar of elongate construction that has a longitudinally disposed slot disposed in one end and extending for less than half the length of the bar, with one end of a cord anchored adjacent the slot, comprising the steps of passing a free end of the cord around the object, and thence passing the free end of the cord back through a hole in the tensioning bar located in an offset relationship to the location at which the cord is anchored, while said tensioning bar is residing in a substantially perpendicular relationship to the object, bringing said cord to an initial degree of tension, preparatory to the step of finally tensioning said cord, anchoring said cord to preserve the initial degree of tension, and then rotating the tensioning bar from the perpendicular relationship to the object into a position flat against the object, such rotation of said tensioning bar, because of such offset relationship, causing the cord to be brought into a final degree of tension around the object, after which said bar is moved into a cord-locking position.

13. The method of tightening a cord around a relatively large object by the use of a tensioning bar as recited in claim 12 in which such rotation of said bar is brought about approximately in the plane of the tensioned cord.

14. The method of tightening a cord around a relatively large object by the use of a tensioning bar as recited in claim 13 in which said rotation of said bar to the cord-locking position taking place over approximately 90°.

15. A self-locking tensioning bar usable for tightening a cord utilized to encircle a relatively large object, said tensioning bar being elongate and of substantially rectangular, flat configuration, said tensioning bar having first and second ends, with a longitudinally disposed slot disposed in said first end, a spaced pair of holes for receiving said cord, with one of said cord-receiving holes located near the outer end of said slot, and consequently near said first end of said tensioning bar, the other of said cord-receiving holes being disposed in a mid portion of said bar, in a longitudinally offset relationship to said one hole, one end of said cord secured in said one cord-receiving hole, with the cord then extending around the relatively large object, and thence back through said other cord-receiving hole, with the cord thereafter being brought to an initial degree of tension and then anchored to said bar at a location adjacent said second end of said bar to maintain such initial degree of tension, this being followed by a twisting of said bar to achieve a locking of said cord around the object in the finally tensioned condition.

16. The self-locking tensioning bar usable for tightening a cord utilized to encircle a relatively large object as recited in claim 15 in which a relatively short pin resides on each side of said longitudinally disposed slot, said pins serving as an alignment means for said cord at such time as said bar has been bent into the position flat against the object and in essential parallelism with the tensioned cord.

17. The self-locking tensioning bar usable for tightening a cord utilized to encircle a relatively large object as recited in claim 15 in which said bar is of a width approximately three times the thickness of the bar, said longitudinally disposed slot and said cord-receiving holes extending from one flat side of the bar to the other, through the thickness dimension of the bar.

18. The self-locking tensioning bar usable for tightening a cord utilized to encircle a relatively large object as recited in claim 15 in which the cord anchoring is accomplished by the use of a slot residing in said second end of said bar, into which slot, the loose end of said cord is tightly fitted.

19. The self-locking tensioning bar usable for tightening a cord utilized to encircle a relatively large object as recited in claim 18 in which a pair of notches are located on said second end of said bar, adjacent said slot, said pair of notches being utilized for securing the loose end of said cord in an encircling relationship to said bar.

20. The self-locking tensioning bar usable for tightening a cord utilized to encircle a relatively large object as recited in claim 15 in which a longitudinal centerline extends the length of said bar, said cord-receiving holes being located relatively close to said longitudinal centerline, and extending through the thickness dimension of said bar.

21. A self-locking tensioning bar usable for tightening a flexible restraining means utilized to encircle a relatively large object, said tensioning bar being elongate and of substantially rectangular configuration, said tensioning bar having first and second ends, with a first longitudinally disposed slot disposed adjacent said first end, and a second longitudinally disposed slot adjacent said second end, a spaced pair of holes for receiving said flexible restraining means, with a first of said holes located near the outer end of said first slot, the other of said holes being disposed in a mid portion of said bar, in a longitudinally offset relationship to said first hole, one end of said flexible restraining means being secured in said first hole, said flexible restraining means then extending around the relatively large object, and thence back through said other hole, said flexible restraining means then to be brought to an initial degree of tension while said bar is residing in a substantially perpendicular relationship to the object, with said first end of said bar closely adjacent the large object, said flexible restraining means then being anchored to said second end of said bar by passing said flexible restraining means at least once through said second slot to maintain such initial degree of tension, whereby upon said tensioning bar thereafter being bent from the perpendicular relationship to the object into a position flat against the object and in essential parallelism with the tensioned flexible restraining means, latter means is caused, because of the offset relationship of said holes, to be brought into a final degree of tension around the object, said bar thereafter being rotated approximately 90° with respect to said tensioned flexible restraining means, to achieve a locking of said flexible restraining means in the finally tensioned condition.

* * * * *